(12) United States Patent
Sekiya et al.

(10) Patent No.: US 8,718,997 B2
(45) Date of Patent: May 6, 2014

(54) NETWORK DESIGN METHOD AND NETWORK DESIGN DEVICE

(75) Inventors: Motoyoshi Sekiya, Kawasaki (JP); Yasuko Nozu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 12/632,344

(22) Filed: Dec. 7, 2009

(65) Prior Publication Data

US 2010/0153084 A1    Jun. 17, 2010

(30) Foreign Application Priority Data

Dec. 17, 2008   (JP) ................................. 2008-320907

(51) Int. Cl.
*G06F 17/50* (2006.01)
*G06G 7/62* (2006.01)

(52) U.S. Cl.
USPC .............................................. 703/13; 370/254

(58) Field of Classification Search
USPC ....................................................... 703/1, 13
See application file for complete search history.

(56) References Cited

U.S. PATENT DOCUMENTS

| | | | | |
|---|---|---|---|---|
| 5,515,367 A | * | 5/1996 | Cox et al. ....................... | 370/404 |
| 5,657,142 A | * | 8/1997 | Fahim ............................... | 398/9 |
| 5,974,127 A | * | 10/1999 | Wernli et al. ............ | 379/201.01 |
| 6,185,193 B1 | | 2/2001 | Kawakami et al. | |
| 6,374,202 B1 | * | 4/2002 | Robinson ....................... | 703/13 |
| 6,418,123 B1 | * | 7/2002 | Kawakami et al. ........... | 370/254 |
| 6,757,494 B2 | | 6/2004 | Warbrick et al. ............... | 398/25 |
| 6,798,747 B1 | * | 9/2004 | Watkins et al. ............... | 370/238 |
| 7,085,697 B1 | * | 8/2006 | Rappaport et al. .............. | 703/13 |
| 7,096,176 B1 | | 8/2006 | Hess ................................ | 703/21 |
| 7,171,124 B2 | | 1/2007 | Smith et al. ...................... | 397/97 |
| 7,318,016 B2 | * | 1/2008 | Watkins et al. ................. | 703/21 |
| 7,623,785 B2 | * | 11/2009 | Krishnaswamy et al. ...... | 398/58 |
| 2003/0158765 A1 | * | 8/2003 | Ngi et al. .......................... | 705/7 |

FOREIGN PATENT DOCUMENTS

JP    11-25133    1/1999

OTHER PUBLICATIONS

Meusburger et al, "Multiperiod Planning for Optical Networks-Approaches Based on Cost Optimization and Limited Budget", IEEE International Conference on Communications, May 19-23, 2008.*
Pickavet et al, "Multi-Period Planning of Survivable WDM Networks", European Transactions on Telecommunications, vol. 11, Issue 1, Jan.-Feb. 2000).*
Geary et al, "Analysis of Optimization Issues in Multi-Period DWDM Network Planning", IEEE INFOCOM, 2001.*
Pickavet et al, "Long-Term Planning of WDM Networks: A Comparison Between Single-Period and Multi-Period Techniques", Photonic Network Communications, 1:4, 331-346, 1999.*
Office Action issued by the Japanese Patent Office on Oct. 2, 2012 in the corresponding Japanese patent application No. 2008-320907.

* cited by examiner

*Primary Examiner* — Mary C Jacob
(74) *Attorney, Agent, or Firm* — Staas & Halsey LLP

(57) ABSTRACT

A network design method includes an input step for inputting a network condition at each of plural timings in advance, an acceptance step for accepting restricting conditions concerning respective costs at the plural timings, a design step for designing a network satisfying a restricting condition accepted in the acceptance step under the network condition input in the input step, and an output step for outputting a design result of the design step.

11 Claims, 25 Drawing Sheets

| GOODS | COST | FIRST YEAR | SECOND YEAR | THIRD YEAR |
|---|---|---|---|---|
| OADM | 7 | 4 | 4 | 4 |
| EXPRESS | 5 | 3 | 3 | 3 |
| ILA | 1 | 9 | 9 | 9 |
| REG | 1 | 32 | 176 | 278 |
| TOTAL COST | | 84 | 228 | 330 |
| STAKE OF EACH YEAR = COST DIFFERENCE BETWEEN YEARS | | 84 | 144 | 102 |
| VARIATION OF COST DIFFERENCE | | 0 | 60 | -42 |

| ITEM | ESSENTIAL INFORMATION | OPTION INFORMATION |
|---|---|---|
| FIBER INFORMATION | FIBER TYPE, DISTANCE, SPAN LOSS, DISPERSION VALUE, PMD VALUE | |
| SITE INFORMATION | NO: INDICATE AUTO (= CALCULATION BASED ON TOOL) | SITE TYPE TO BE INDICATED, PERMITTED SITE TYPE, PROHIBITED SITE TYPE |
| DEMAND | FROM/TO SITE, ACCOMMODATION SERVICE TYPE, PRESENCE OR ABSENCE OF PROTECTION | GOODS TO BE USED, ROUTE TO BE INDICATED, USE WAVELENGTH TO BE INDICATED |

FIG. 3

| | |
|---|---|
| FIRST-YEAR COST IS MINIMUM | DESIGN FOR MINIMIZING FIRST-YEAR COST |
| ALL-YEAR COSTS ARE NOT MORE THAN THRESHOLD VALUE | DESIGN FOR SETTING EACH COST OF ALL YEARS TO THRESHOLD VALUE OR LESS |
| ALL-YEAR ACCUMULATED COST IS MINIMUM | DESIGN FOR MINIMIZING ACCUMULATED COST OF ALL YEARS |

| ITEM | OUTPUT INFORMATION |
|---|---|
| SITE TYPE ON SITE BASIS | OADM, EXPRESS, ILA, Bypass |
| SETUP GOODS ON SITE BASIS | FIGURE NUMBER, COST, POWER CONSUMPTION |
| GOODS CONSTRUCTION DIAGRAM ON SITE BASIS | RACK MOUNT DIAGRAM, CABLING DIAGRAM |
| DEMAND ROUTING | |
| OPTICAL CHARACTERISTIC ON DEMAND BASIS | OSNR, DISPERSION MAP, POWER LEVEL |
| REACHABILITY DATA | OPTICAL REACHABILITY FROM EACH SITE TO ANOTHER SIDE, OPTICAL CHARACTERISTIC OF REACHABLE SECTION |

FIG. 6

| REQUIRED NUMBER OF REG ON DEMAND BASIS | NUMBER OF VIA OADM SECTIONS THROUGH WHICH DEMAND PASSES | | | | | | | | | |
|---|---|---|---|---|---|---|---|---|---|---|
| | 0 | 1 | 2 | 3 | 4 | 5 | 6 | 7 | 8 | 9 |
| 1 | 0 | 0 | 0 | 1 | - | - | - | - | - | - |
| 2 | 0 | 0 | 1 | 1 | 2 | 2 | 3 | - | - | - |
| 3 | 0 | 1 | 1 | 2 | 2 | 3 | 3 | 4 | 5 | 5 |

| FIRST YEAR | | SECOND YEAR | | THIRD YEAR | |
|---|---|---|---|---|---|
| DEMAND | t=1 DEMAND NUMBER | DEMAND | t=2 DEMAND NUMBER | DEMAND | t=3 DEMAND NUMBER |
| BETWEEN A AND B | 10 | BETWEEN A AND B | 15 | BETWEEN A AND B | 20 |
| BETWEEN B AND C | 1 | BETWEEN B AND C | 10 | BETWEEN B AND C | 13 |
| BETWEEN C AND D | 5 | BETWEEN C AND D | 5 | BETWEEN C AND D | 5 |
| BETWEEN A AND C | 0 | BETWEEN A AND C | 13 | BETWEEN A AND C | 13 |
| BETWEEN B AND D | 0 | BETWEEN B AND D | 1 | BETWEEN B AND D | 9 |
| BETWEEN A AND D | 0 | BETWEEN A AND D | 0 | BETWEEN A AND D | 10 |
| TOTAL | 16 | TOTAL | 44 | TOTAL | 70 |

FIG. 8

| | DEMAND NUMBER | | DEMAND NUMBER BETWEEN ROUTING AND OADM NODE | | | | | | |
|---|---|---|---|---|---|---|---|---|---|
| BETWEEN A AND B | ROUTING | | A ⟷ | | B | | C | | D |
| | FIRST YEAR | 10 | A | 10 | B | 0 | C | 0 | D |
| | SECOND YEAR | 15 | A | 15 | B | 0 | C | 0 | D |
| | THIRD YEAR | 20 | A | 20 | B | 0 | C | 0 | D |
| BETWEEN B AND C | ROUTING | | A | | B ⟷ | | C | | D |
| | FIRST YEAR | 1 | A | 0 | B | 1 | C | 0 | D |
| | SECOND YEAR | 10 | A | 0 | B | 10 | C | 0 | D |
| | THIRD YEAR | 13 | A | 0 | B | 13 | C | 0 | D |
| BETWEEN C AND D | ROUTING | | A | | B | | C ⟷ | | D |
| | FIRST YEAR | 5 | A | 0 | B | 0 | C | 5 | D |
| | SECOND YEAR | 5 | A | 0 | B | 0 | C | 5 | D |
| | THIRD YEAR | 5 | A | 0 | B | 0 | C | 5 | D |
| BETWEEN A AND C | ROUTING | | A ⟷ | | B | | C | | D |
| | FIRST YEAR | 0 | A | 0 | B | 0 | C | 0 | D |
| | SECOND YEAR | 13 | A | 13 | B | 13 | C | 0 | D |
| | THIRD YEAR | 13 | A | 13 | B | 13 | C | 0 | D |
| BETWEEN B AND D | ROUTING | | A | | B ⟷ | | C | | D |
| | FIRST YEAR | 0 | A | 0 | B | 0 | C | 0 | D |
| | SECOND YEAR | 1 | A | 0 | B | 1 | C | 1 | D |
| | THIRD YEAR | 15 | A | 0 | B | 15 | C | 15 | D |
| BETWEEN A AND D | ROUTING | | A ⟷ | | B | | C | | D |
| | FIRST YEAR | 0 | A | 0 | B | 0 | C | 0 | D |
| | SECOND YEAR | 10 | A | 10 | B | 10 | C | 10 | D |
| | THIRD YEAR | 15 | A | 15 | B | 15 | C | 15 | D |
| TOTAL | FIRST YEAR | 16 | A | 10 | B | 1 | C | 5 | D |
| | SECOND YEAR | 54 | A | 38 | B | 34 | C | 16 | D |
| | THIRD YEAR | 81 | A | 48 | B | 56 | C | 35 | D |

FIG. 10

| UPPER STAGE | SECTION NUMBER | ILA NUMBER | REG NUMBER PER DEMAND |
|---|---|---|---|
| BETWEEN A AND B | 1 | 3 | 1 |
| | REG NUMBER | FIRST YEAR | 10 |
| | | SECOND YEAR | 15 |
| | | THIRD YEAR | 20 |
| BETWEEN B AND C | 1 | 3 | 1 |
| | REG NUMBER | FIRST YEAR | 1 |
| | | SECOND YEAR | 10 |
| | | THIRD YEAR | 13 |
| BETWEEN C AND D | 1 | 3 | 1 |
| | REG NUMBER | FIRST YEAR | 5 |
| | | SECOND YEAR | 5 |
| | | THIRD YEAR | 5 |
| BETWEEN A AND C | 2 | 6 | 3 |
| | REG NUMBER | FIRST YEAR | 0 |
| | | SECOND YEAR | 39 |
| | | THIRD YEAR | 39 |
| BETWEEN B AND D | 2 | 6 | 3 |
| | REG NUMBER | FIRST YEAR | 0 |
| | | SECOND YEAR | 3 |
| | | THIRD YEAR | 45 |
| BETWEEN A AND D | 3 | 9 | 5 |
| | REG NUMBER | FIRST YEAR | 0 |
| | | SECOND YEAR | 50 |
| | | THIRD YEAR | 75 |
| TOTAL | REG/DEMAND NUMBER | FIRST YEAR | 32 |
| | | SECOND YEAR | 176 |
| | | THIRD YEAR | 278 |

FIG. 11

| GOODS | COST | FIRST YEAR | SECOND YEAR | THIRD YEAR |
|---|---|---|---|---|
| OADM | 7 | 4 | 4 | 4 |
| EXPRESS | 5 | 3 | 3 | 3 |
| ILA | 1 | 9 | 9 | 9 |
| REG | 1 | 32 | 176 | 278 |
| TOTAL COST | | 84 | 228 | 330 |
| STAKE OF EACH YEAR = COST DIFFERENCE BETWEEN YEARS | | 84 | 144 | 102 |
| VARIATION OF COST DIFFERENCE | | 0 | 60 | -42 |

1100

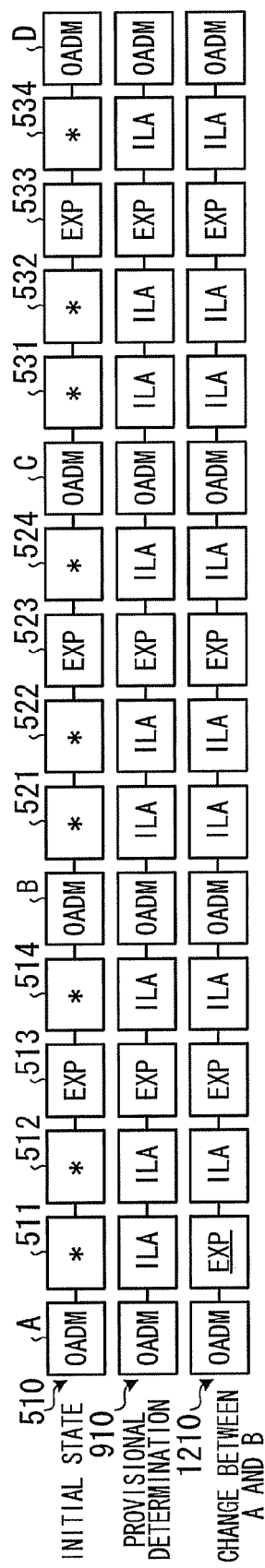

FIG. 13

| UPPER STAGE | SECTION NUMBER | ILA NUMBER | REG NUMBER PER DEMAND |
|---|---|---|---|
| BETWEEN A AND B | 1 | 2 | 0 |
| | REG NUMBER | FIRST YEAR | 0 |
| | | SECOND YEAR | 0 |
| | | THIRD YEAR | 0 |
| BETWEEN B AND C | 1 | 3 | 1 |
| | REG NUMBER | FIRST YEAR | 1 |
| | | SECOND YEAR | 1 |
| | | THIRD YEAR | 13 |
| BETWEEN C AND D | 1 | 3 | 1 |
| | REG NUMBER | FIRST YEAR | 5 |
| | | SECOND YEAR | 5 |
| | | THIRD YEAR | 5 |
| BETWEEN A AND C | 2 | 5 | 2 |
| | REG NUMBER | FIRST YEAR | 0 |
| | | SECOND YEAR | 26 |
| | | THIRD YEAR | 26 |
| BETWEEN B AND D | 2 | 6 | 3 |
| | REG NUMBER | FIRST YEAR | 0 |
| | | SECOND YEAR | 3 |
| | | THIRD YEAR | 45 |
| BETWEEN A AND D | 3 | 8 | 5 |
| | REG NUMBER | FIRST YEAR | 0 |
| | | SECOND YEAR | 50 |
| | | THIRD YEAR | 75 |
| TOTAL | REG/DEMAND NUMBER | FIRST YEAR | 22 |
| | | SECOND YEAR | 148 |
| | | THIRD YEAR | 245 |

FIG. 14

| GOODS | COST | FIRST YEAR | SECOND YEAR | THIRD YEAR |
|---|---|---|---|---|
| OADM | 7 | 4 | 4 | 4 |
| EXPRESS | 5 | 4 | 4 | 4 |
| ILA | 1 | 8 | 8 | 8 |
| REG | 1 | 22 | 148 | 245 |
| TOTAL COST | | 78 | 204 | 301 |
| COST DIFFERENCE BETWEEN YEARS | | 78 | 126 | 97 |
| VARIATION OF COST DIFFERENCE | | 0 | 48 | −29 |

| COST DIFFERENCE BETWEEN YEARS | FIRST YEAR - SECOND YEAR | SECOND YEAR - THIRD YEAR |
|---|---:|---:|
| PROVISIONAL DETERMINATION | 60 | -42 |
| AFTER CHANGE BETWEEN A AND B | 48 | -29 |

FIG. 17

| | COST DIFFERENCE BETWEEN YEARS | FIRST YEAR-SECOND YEAR | SECOND YEAR-THIRD YEAR |
|---|---|---|---|
| 1510 | PROVISIONAL DETERMINATION | 60 | -42 |
| 1520 | CHANGE BETWEEN A AND B | 48 | -29 |
| 1710 | CHANGE BETWEEN B AND C | 25 | -31 |
| 1720 | CHANGE BETWEEN C AND D | 16 | -26 |
| 1730 | RE-CHANGE BETWEEN A AND B | -1 | -13 |
| 1740 | RE-CHANGE BETWEEN B AND C | -16 | -21 |
| 1750 | RE-CHANGE BETWEEN C AND D | -20 | -21 |
| 1760 | THIRD-CHANGE BETWEEN A AND B | -47 | -3 |
| 1770 | THIRD-CHANGE BETWEEN B AND C | -52 | -16 |
| 1780 | THIRD-CHANGE BETWEEN C AND D | -66 | -11 |

| UPPER STAGE | SECTION NUMBER | ILA NUMBER | | REG NUMBER PER DEMAND |
|---|---|---|---|---|
| BETWEEN A AND B | 1 | 1 | | 0 |
| | REG NUMBER | FIRST YEAR | | 0 |
| | | SECOND YEAR | | 0 |
| | | THIRD YEAR | | 0 |
| BETWEEN B AND C | 1 | 2 | | 0 |
| | REG NUMBER | FIRST YEAR | | 0 |
| | | SECOND YEAR | | 0 |
| | | THIRD YEAR | | 0 |
| BETWEEN C AND D | 1 | 2 | | 0 |
| | REG NUMBER | FIRST YEAR | | 0 |
| | | SECOND YEAR | | 0 |
| | | THIRD YEAR | | 0 |
| BETWEEN A AND C | 2 | 3 | | 1 |
| | REG NUMBER | FIRST YEAR | | 0 |
| | | SECOND YEAR | | 13 |
| | | THIRD YEAR | | 13 |
| BETWEEN B AND D | 2 | 4 | | 2 |
| | REG NUMBER | FIRST YEAR | | 0 |
| | | SECOND YEAR | | 2 |
| | | THIRD YEAR | | 30 |
| BETWEEN A AND D | 3 | 5 | | 3 |
| | REG NUMBER | FIRST YEAR | | 0 |
| | | SECOND YEAR | | 30 |
| | | THIRD YEAR | | 45 |
| TOTAL | REG/DEMAND NUMBER | FIRST YEAR | | 16 |
| | | SECOND YEAR | | 99 |
| | | THIRD YEAR | | 169 |

FIG. 19

| GOODS | COST | FIRST YEAR | SECOND YEAR | THIRD YEAR |
|---|---|---|---|---|
| OADM | 7 | 4 | 4 | 4 |
| EXPRESS | 5 | 7 | 7 | 7 |
| ILA | 1 | 5 | 5 | 5 |
| REG | 1 | 16 | 99 | 169 |
| TOTAL COST | | 84 | 167 | 237 |
| COST DIFFERENCE BETWEEN YEARS | | 84 | 83 | 70 |
| VARIATION OF COST DIFFERENCE | | 0 | -1 | -13 |

| GOODS | COST | FIRST YEAR | SECOND YEAR | THIRD YEAR |
|---|---|---|---|---|
| OADM | 7 | 4 | 4 | 4 |
| EXPRESS | 5 | 4 | 4 | 4 |
| ILA | 1 | 8 | 8 | 8 |
| REG | 1 | 22 | 148 | 245 |
| TOTAL COST | | 78 | 204 | 301 |
| COST DIFFERENCE BETWEEN YEARS | | 78 | 126 | 97 |
| VARIATION OF COST DIFFERENCE | | 0 | 48 | −29 |

| GOODS | COST | FIRST YEAR | SECOND YEAR | THIRD YEAR |
|---|---|---|---|---|
| OADM | 7 | 4 | 4 | 4 |
| EXPRESS | 5 | 12 | 12 | 12 |
| ILA | 1 | 0 | 0 | 0 |
| REG | 1 | 16 | 54 | 81 |
| TOTAL COST | | 104 | 142 | 169 |
| COST DIFFERENCE BETWEEN YEARS | | 104 | 38 | 27 |
| VARIATION OF COST DIFFERENCE | | | −66 | −11 |

NETWORK DESIGN METHOD AND NETWORK DESIGN DEVICE

CROSS-REFERENCE TO RELATED APPLICATIONS

This application is based upon and claims the benefit of priority of the prior Japanese Patent Application No. 2008-320907, filed on Dec. 17, 2008, the entire contents of which are incorporated herein by reference.

BACKGROUND

A network design device for designing a communication system using a WDM (Wavelength Division Multiplexing) device determines a demand route (routing) and goods to be setup at each site according to a fiber condition and a demand input. For example, the network design device determines the demand route and the goods so that the cost of the first year is optimum.

SUMMARY

A network design method includes an input step for inputting a network condition at each of plural timings in advance, an acceptance step for accepting restricting conditions concerning respective costs at each of the plural timings, a design step for designing a network satisfying a restricting condition accepted in the acceptance step under the network condition input in the input step, and an output step for outputting a design result of the design step.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

BRIEF DESCRIPTION OF DRAWINGS

FIG. 2 is a diagram showing an example of a network condition;
FIG. 3 is a diagram showing an example of a restricting condition;
FIG. 4 is a diagram showing an example of a design result;
FIG. 6 is a diagram showing an example of a network condition (performance condition);
FIG. 7 is a diagram showing an example of a network condition (demand condition);
FIG. 8 is a diagram showing the routing based on the demand condition;
FIG. 10 is a diagram showing the number of REGs (REG number) per demand in the design shown in FIG. 9;
FIG. 11 is a diagram showing the total cost in the design shown in FIG. 9;
FIG. 12 is a diagram (part 2) showing an example of the site type selection;
FIG. 13 is a diagram showing the REG number per demand in the design shown in FIG. 12;
FIG. 14 is a diagram showing the total cost in the design shown in FIG. 12;
FIG. 15 is a diagram (part 1) showing the comparison in variation of the total cost difference among respective years;
FIG. 17 is a diagram (part 2) showing the comparison in variation of the total cost difference among respective years;
FIG. 18 is a diagram showing the REG number per demand in the design indicated by reference numeral 1630 of FIG. 16;
FIG. 19 is a diagram showing the total cost in the design indicated by reference numeral 1630 of FIG. 16;
FIG. 21 is a diagram showing an example of a design result based on the operation shown in FIG. 20;
FIG. 23 is a diagram showing an example of the design result based on the operation shown in FIG. 22.

DESCRIPTION OF EMBODIMENTS

Embodiments of a network design method and a network design device will be described hereunder in detail with reference to the accompanying drawings.

According to the network design device and the network design method, a network condition every plural timings and restricting conditions concerning respective costs at plural timings are used as an input parameter. Accordingly, time-lapse variations of the restricting condition and the network condition can be reflected to a design result.

Figure 1:
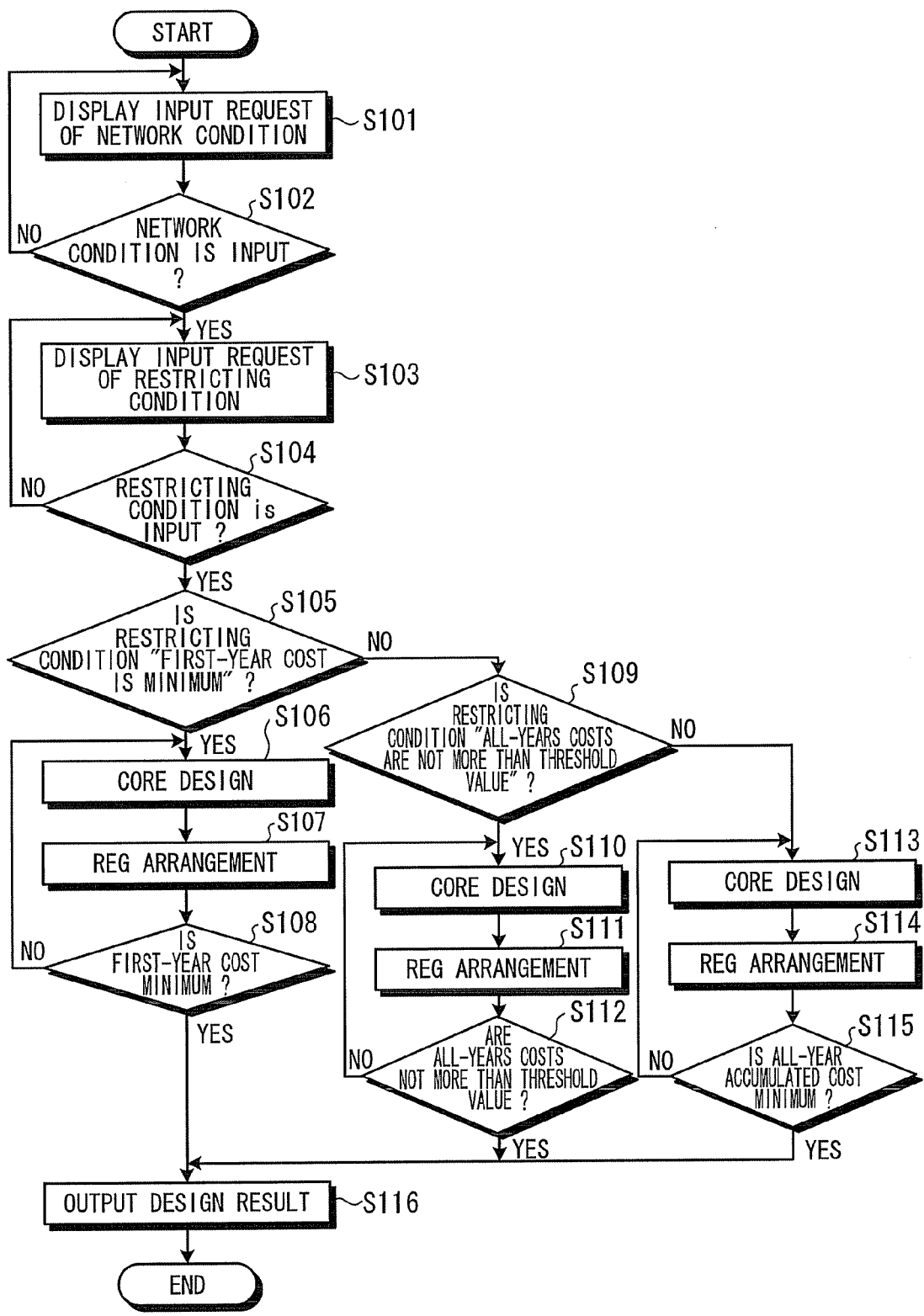
FIG. 1 is a flowchart showing an example of a network design method according to an embodiment.

FIG. 1 is a flowchart showing an example of the network design method according to an embodiment. As shown in FIG. 1, a network design device according to this embodiment displays an input request of a network condition (see FIG. 2) for a user (step S101). Subsequently, the device determines whether a network condition is input from the user or not (step S102), and waits until the network condition is input (loop of step S102: No).

When the network condition is input in step S102 (step S102: Yes), an input request of a restricting condition (see FIG. 3) is displayed for the user (step S103). In response to this display, the user of the network design device can select one of "first-year cost is minimum", "all-year costs are not more than threshold value" and "all-year accumulated cost is minimum" as a restricting condition and input the selected restricting condition into the network design device.

Subsequently, the network design device determines whether a restricting condition is input from the user or not (step S104), and waits until the restricting condition is input (loop of step S104: No). When the restricting condition is input (step S104: Yes), the device determines whether the restricting condition input in step S104 is "first-year cost is minimum" or not (step S105).

When the input restricting condition is determined to be "first-year cost is minimum" in step S105 (step S105: Yes), a core design is executed according to a predetermined procedure (step S106). REG arrangement is executed on the basis of the result of the core design (step S107). Subsequently, it is determined whether the cost of the first year is minimized by the core design in step S106 and the REG arrangement in step S107 (step S108).

When the cost of the first year is not minimum in step S108 (step S108: No), the processing is returned to the step S106 and continued. On the other hand, when the cost of the first year is minimum in step S108 (step S108: Yes), the processing is shifted to step S116 and continued.

When the input restricting condition is not "first-year cost is minimum" in step S105 (step S105: No), it is determined whether the restricting condition input in step S104 is "all-year costs are not more than threshold value" or not (step S109).

When the input restricting condition is "all-year costs are not more than threshold value" in step S109 (STEP s109: Yes), the core design is executed according to the predetermined procedure (step S110), and the REG arrangement is executed on the basis of the core design result (step S111). Subsequently, it is determined whether the all-year costs are not more than the threshold value by the core design in step S110 and the REG arrangement in step S111 (step S112).

When "all-year costs are not more than threshold value" is negative (step S112: No), the processing is returned to step S110 and continued. When "all-year costs are not more than threshold value" is positive (step S112: Yes), the processing is shifted to step S116 and continued.

When the input restricting condition is not "all-year cost is not more than threshold value" in step S109 (S109: No), the core design is executed according to the predetermined procedure (step S113) and the REG arrangement is executed on the basis of the result of the core design (step S114). Subsequently, it is determined whether the accumulated cost of all the years is minimized by the core design in step S113 and the REG arrangement in step S114 (step S115).

When the accumulated cost of all the years is not minimized (step S115: No), the processing is returned to the step S113 and continued. When the accumulated cost of all the years is minimum (step S115: Yes), the processing is shifted to step S116 and continued. Subsequently, the design result is output to the user (step S116), and the series of processing is finished.

After the design result is output to the user in step S116, a message prompting the user to select a restricting condition again and input the selected restricting condition may be indicated to the user, and then the processing may be returned to step S104 and continued. Accordingly, the user can input to the network design device restricting conditions which have not yet been selected, whereby the user can easily obtain design results based on plural restricting conditions.

FIG. 2 is a diagram showing an example of the network condition. In step S101 shown in FIG. 1, the network design device indicates, to the user, an item 210 and essential information 220 of a table 200 and a message prompting the user to input data concerning the item 210 and the essential information 220, for example. Furthermore, when there is any option information 230 which can be arbitrarily input by the user, option information 230 and a message indicating that the user can input also option information 230 may be indicated to the user.

As indicated in the item 210, fiber information, site information, demand information, etc. may be used as the network condition. The fiber information is information concerning optical fibers through which respective sites are connected to one another. The fiber information contains fiber type, distance, span loss, dispersion value, PMD (Polarization Mode Dispersion) value, etc. as the essential information 220.

The site information is information concerning a site provided as a station (node). The site information contains indicating information of the presence/absence of calculation based on a tool (network design device) as the essential information 220. With respect to the site information, a site type which is wished to be indicated as the option information 330, a permitted site type and a prohibited site type.

The demand information is information concerning a requested network path. The demand information contains a FROM/TO (start point/terminal point) site, an accommodated service type and the presence or absence of protection as the essential information 220. With respect to the demand information, goods which the user wishes to use as the option information 330, a route which the user wishes to indicate and a using wavelength which the user wishes to indicate are contained in the demand information.

Different materials are contained in these network conditions in accordance with the timing. The network condition which varies in accordance with the timing is input in advance every plural timings in step S101 shown in FIG. 1. The plural timings (seasons) mean plural days (for example, from first day to thirteenth day), plural months (for example, from April to May), plural years (for example, first year to third year) or the like. For example, the site information and the demand information are network conditions which annually vary in accordance with an increase/decrease in number of customers, the traffic amount or the like.

FIG. 3 is a diagram showing an example of the restricting condition. As described with reference to FIG. 1, the user can select as a restricting condition any one of "first-year cost is minimum", "all-year costs are not more than threshold value" and "all-year accumulated cost is minimum" shown in the table 300 and then input the selected restricting condition into the network design device. The "first-year cost is minimum" is a restricting condition under which the investment cost based on the network design of the first year is minimum. The restricting condition is not limited to the restricting condition under the first year, but it may be a restricting condition under which the investment cost based on the network design of a specific timing (or year) which is specified from plural timings (or years) by a user is minimum.

The "all-year costs are not more than threshold value" is a restricting condition that all the investment costs based on network designs of respective years are not more than a threshold value. The "all-year accumulated cost is minimum" is a restricting condition that the total of the respective investment costs based on the network designs of respective years is minimum. Other restricting conditions concerning each cost at plural timings (seasons) such as "the variation of the total cost of each year is minimum", etc. may be used as the restricting condition.

FIG. 4 is a diagram showing an example of the design result. In step S103 shown in FIG. 1, the network design device outputs a design result as shown in a table 400 to the user. The design result shown in the table 400 contains an item 410 and output information 420 corresponding to each item 410.

The item 410 contains a site type on a site basis (OADM, EXPRESS, ILA, Bypass, etc.), setup goods on a site basis (figure number, cost, power consumption, etc.), goods construction diagram on a site basis (rack mount diagram, cabling diagram, etc.), demand routing, optical characteristic on a demand basis (OSNR, dispersion map, power level, etc.), and reachability (optical reachability from each site to another site, optical characteristic of a reachable section, etc.).

Next, a cost estimating method is described as used in steps S108, S112 and S115 shown in FIG. 1. A demand k from a site n1 to a site n2 at a timing t is represented by D1 (n1, n2, t). In the case of D1(n1, n2, t)=1, it represents that a demand k from the site n1 to the site n2 at the timing t exists. In the case of D1(n1, n2, t)=0, it represents that the demand k from the site n1 to the site n2 at the timing t does not exist.

When the maximum of the demand k is represented by K, $1 \leq k \leq K$ is satisfied. K represents the total of the demands k at all the timings t. The total demand number of the overall network at any timing t is represented by $\Sigma Dk(n1, n2, t)$. $d\Sigma D1/dt$ represents the differential variation of the total demand number.

A site is represented by Ii(t). In the case of Ii(t)=1, it represents that the site i exists at the timing t. In the case of Ii(t)=10, it represents that the site i does not exist at the timing t. A link is represented by Lk(Ii, Ij, t). In the case of Lk(Ii, Ij, t)=1, it represents that a link from the site i to the site j exists at the timing t. In the case of Lk(Ii, Ij, t)=0, it represents that a link from the site i to the site j does not exit at the timing t.

The following relation is satisfied between the site I and the link L. First, it is impossible to allocate a demand route at a place where either site or link does not exist. Next, it is impossible to allocate a site type to a place at which no site exists. That is, the relation between the site I and the link L brings a physical constraint to the network design.

The input/output information of the site is represented by SiteTypein(Ni,t) and SiteTypeout(Ni,t). Specifically, the input-time site type at the timing t of the site i is represented by SiteTypein(Ni,t). A selectable site type, such as OADM, EXPRESS, ILA or the like, is set in SiteTypein(Ni,t).

The output-time site type at the timing t of the site i is represented by SiteTypeout(Ni,t). A site cost is determined by SiteTypein(Ni,t) and SiteTypeout(Ni,t). Accordingly, the site cost is a function of the timing t.

The relation between the demand number and the network is represented by aDk, I(t). In the case of aDk, 1(t)=1, it represents that the demand Dk passes through the link I. In the case of aDk, 1(t)=0, it represents that the demand Dk does not pass through the link I. The demand route for a demand Dk(i,j,t) is represented by a list List{a d, I(t)} corresponding to links through which the demand passes. The demand number corresponding to the demand route is represented by a parameter DPI(i,j,t).

The reachability number to the demand number is represented by (NLpij)=(Ncijk). The reachability number of the demand route allocated to the demand Dk(I,j,t) is calculated, and the reachability number (write pass number) constituting the demand is represented. For example, when some demand is constructed by three reachabilities, it means 2 Reg.

The reachability constructing the demand Dk(i,j,t) is represented by RtypeDkI(t)I. When a route is allocated to some demand and the reachabilities constructing the route concerned are ordered, it represents what the I-th (I=1 to m) type is. Reg is allocated to i-different places, and on the basis of support or non-support by Reg, it is determined whether there is any difference in Rtype.

In steps S108. S112 and S115 of FIG. 1, Ccoreij and Cregij are used as parameters of an estimation function. Ccoreij is a core cost in the section between the site i and the site j. Assuming that Ccoreij=fcore(Ncijk), $fcore(Ncijk)=\Sigma cI \times CcostI$. CI represents the number of site type I and CcostI represents the unit cost of the site type I.

The demand cost Cregtotal(t) is determined by the demand reachability type constituting each demand. In the case of the same demand reachability, Cregtotal=$\Sigma ij$Creg DP(Ij)(NLPij−1). The total (total cost) of Ccoreij and Cregtotal is use as a final estimation function.

As described above, in the network design device according to this embodiment, plural timing-basis network conditions are input in advance, and restricting conditions concerning respective costs at plural timings are accepted. The network design device designs a network satisfying an accepted restricting condition in the input network conditions, and outputs a design result.

As described above, the time-lapse variation of the restricting condition and the network condition can be reflected to the design result. Therefore, even when the restricting condition or the network condition varies with time lapse, a desired design result can be obtained. Furthermore, at least any one of plural restrictions condition containing restricting conditions concerning respective costs is allowed to be accepted, so that the operator of the network can easily perform network design in accordance with the investment policy on a timing basis.

Next, a specific example of the network design will be described with reference to FIGS. 5 to 24.

Figure 5:
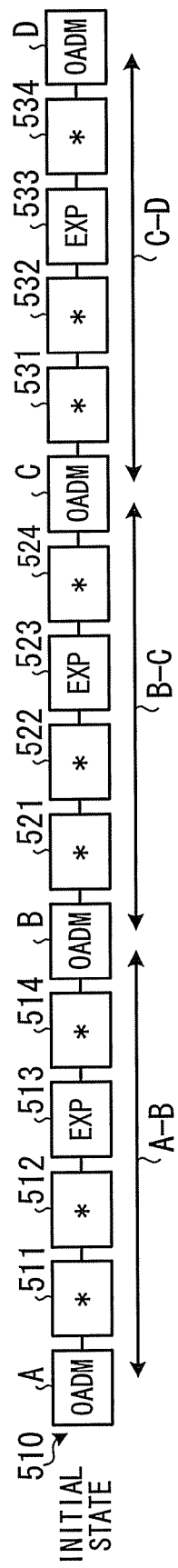
FIG. 5 is a diagram showing an example of a network condition (site condition)

FIG. 5 is a diagram showing an example of the network condition (site condition). As indicated by reference numeral 510 (initial state) of FIG. 5, it is assumed that a linear network containing sixteen sites A to D, 511 to 514, 521 to 524 and 531 to 534 is designed. Each of the sites A, B, C and D is an OADM node which can subject optical signals to Add/Drop.

The sites 511 to 514 are connected between the sites A and B. The sites 521 to 524 are connected between the sites B and C. Sites 531 to 534 are connected between the sites C and D. Each of the sites 513, 523 and 533 is represented by EXPRESS (represented as "EXP" in FIG. 5, this is also applied to the following description). EXPRESS is OADM in which REG (reproducing unit of light-electricity-light) can be accommodated.

EXPRESS is high in cost, however, it can suppress noise deterioration to the minimum level. Therefore, when EXPRESS is arranged, the required number of REGs per demand can be reduced. Any one of ILA and EXPRESS can be selected and arranged at each of the sites 511, 512, 514, 521, 522, 524, 531, 532 and 534 to which "*" is affixed. ILA is an amplifier which is low in cost, however, increases noise deterioration.

Next, the cost condition based on each site type which is arranged in each site will be described. The cost when OADM is arranged at a site is set to 7. The cost when EXPRESS is arranged in a site is set to 5. The cost when ILA is arranged at a site is set to 1. The cost when one REG is accommodated in EXPRESS or the like is set to 1.

FIG. 6 is a diagram showing an example of the network condition (performance condition). A table 600 shown in FIG. 6 represents the required number of REGs per demand as the performance condition contained in the network condition. In the table 600, the required number of REGs to the number 610 of ILAs through which any demand passes is represented every number 620 of OADM sections through which the demand passes.

For example, when the demand passes between the sites A and B (OADM section number 1) and three ILAs are provided between the sites A and B, the required number of REGS is equal to 1. Furthermore, when the demand passes between the sites B and D (OADM section number 2) and four ILAs are provided between the sites Band D, the required number of REGs is equal to 2. Furthermore, when the demand passes through the sites A to D (OADM section number 3) and eight ILAs are provided between the sites A and D, the required number of REGs is equal to 5.

FIG. 7 is a diagram showing an example of the network condition (demand condition). A table 700 shown in FIG. 7 represents the demand number of each OADM section as the demand condition contained in the network condition. In the table 700, the demand number of each OADM is represented every year (t=1, 2, 3 (first to third years)). For example, the demand number between the sites A and B is equal to 10 in the first year, 15 in the second year and 20 in the third year.

FIG. 8 is a diagram showing the routing based on the demand condition. In the routing, at least the demand number of each of the OADM sections which are adjacent so as to satisfy the demand condition shown in FIG. 7 is determined (table 800). With respect to the first to third years between the sites A and B, between the sites B and C, between the sites C and D and between the sites A and C, the first and second years between the sites B and D and the first year between the sites A and D, the demand numbers are arranged so as to just satisfy the demand condition shown in FIG. 7.

Furthermore, with respect to the third year between the sites B and D, the demand number 15 is arranged for the demand condition of 9. Furthermore, with respect to the second year between the sites A and D, the demand number 10 is arranged for the demand condition of 0. Furthermore, with respect to the third year between the sites A and D, the demand number 15 is arranged for the demand condition of 10. "Total" represents the total of the demand numbers in each of the first to third years every adjacent OADM section.

As shown in "Total", the total of the demand numbers of the first year is equal to 16. In the first year, the demand number 10, the demand number 1 and the demand number 5 are allocated between the sites A and B, between the sites B and C and between the sites C and D, respectively. The total of the demand numbers of the second year is equal to 54. In the second year, the demand number 38, the demand number 34 and the demand number 16 are allocated between the sites A and B, between the sites B and C and between the sites C and D, respectively. The total of the demand numbers of the third year is equal to 81. The demand number 48, the demand number 56 and the demand number 35 are allocated between the sites A and B, between the sites B and C and between the sites C and D, respectively.

Figure 9:
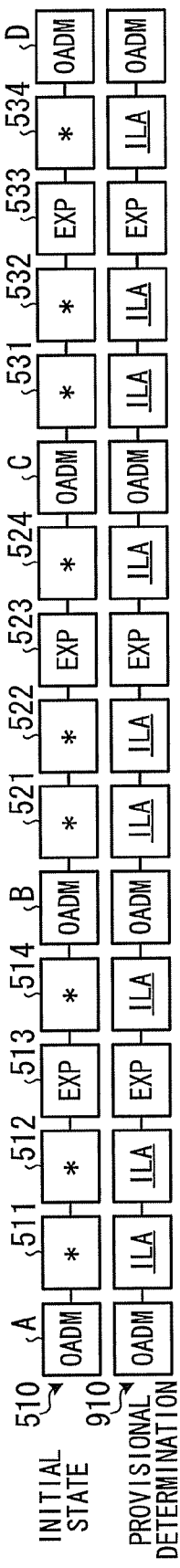
FIG. 9 is a diagram (part 1) showing an example of site type selection.

FIG. 9 is a diagram (part 1) showing an example of the site type selection. In FIG. 9, the same constituent elements as shown in FIG. 5 are represented by the same reference numerals, and the description thereof is omitted. As indicated by reference numeral 910 of FIG. 9, in the site type selection, it is first provisionally determined that ILA is allocated all of sites (sites 511, 512, 514, 521, 522, 524, 531, 532, 534) to which "*" is affixed so that the core cost is minimum.

FIG. 10 is a diagram showing REG number per demand in the design shown in FIG. 9. A table 1000 of FIG. 10 represents the required number of REGs of each demand shown in FIG. 6, and REG number per demand which is calculated on the basis of the provisional determination of the site type shown in FIG. 9. In this case, REG numbers between the sites A and B, between the sites A and C and between the sites A and D in the respective OADM sections will be described.

As shown in the table 1000, between the sites A and B, The OADM section number is equal to 1, and the ILA number is equal to 3, so that the required REG number per demand is equal to 1 (see FIG. 6). The demand number in the first year between the sites A and B is equal to 10 (see FIG. 8), and thus the required REG number in the first year between the sites A and B is equal to 1×10=10.

Furthermore, the demand number in the second year between the sites A and B is equal to 15 (see FIG. 8), and thus the required REG number in the second year between the sites A and B is equal to 1×15=15. Furthermore, the demand number in the third year between the sites A and B is equal to 20 (see FIG. 8), and thus the required REG number in the third year between the sites A and B is equal to 1×20=20.

As shown in the table 1000, the OADM section number is equal to 2 and the ILA number is equal to 6 between the sites A and C, and thus the required REG number per demand is equal to 3 (see FIG. 6). The demand number in the first year between the sites A and C is equal to 0 (see FIG. 8), and thus the required REG number in the first year between the sites A and C is equal to 3×0=0.

Furthermore, the demand number in the second year between the sites A and C is equal to 13 (see FIG. 8), and thus the required REG number in the second year between the sites A and C is equal to 3×13=39. The demand number in the third year between the sites A and C is equal to 13 (see FIG. 8), and thus the required REG number in the third year between the sites A and C is equal to 3×13=39.

As shown in the table 1000, between the sites A and D, the OADM section number is equal to 3 and the ILA number is equal to 9, so that the required REG number per demand is equal to 5 (see FIG. 6). Furthermore, the demand number in the first year between the sites A and D is equal to zero (see FIG. 8), so that the required REG number in the first year between the sites A and D is equal to 5×0=0.

Furthermore, the demand number in the second year between the sites A and D is equal to 10 (see FIG. 8), and thus the required REG number in the second year between the sites A and D is equal to 5×10=50. The demand number in the third year between the sites A and D is equal to 15 (see FIG. 8), and thus the required REG number in the third year between the sites A and D is equal to 5×15=7.

FIG. 11 is a diagram showing the total cost in the design shown in FIG. 9. A table 1100 of FIG. 11 represents the total cost calculated on the basis of the provisional determination of the site type shown in FIG. 9 and the REG number required every OADM section shown in FIG. 10.

In the first year, four OADMs (cost 7), three EXPRESSes (cost 5), nine ILAs (cost 1) and 32 REGs (cost 1) are arranged. Accordingly, the total cost of the first year is equal to 7×4+5×3+1×9+1×32=84. Since no previous year exists prior to the first year (initial year), the difference between the first year and the previous year is equal to 84. The variation of the total cost difference of the first year is equal to 0.

In the second year, four OADMs (cost 7), three EXPRESSes (cost 5), nine ILAs (cost 1) and 176 REGs (cost 1) are arranged. Accordingly, the total cost of the second year is equal to 7×4+5×3+1×9+1×176=228. The total cost difference of the second year from the previous year (first year) is equal to 228−84=144.

The total cost difference of the first year from the previous year is equal to 84, and the total cost difference of the second year form the previous year (first year) is equal to 144, and thus the variation from the total cost difference of the first year to the total cost difference of the second year is equal to 144−84=60.

In the third year, four OADMs (cost 7), three EXPRESSes (cost 5), nine ILAs (cost 1) and 278 REGS (cost 1) are arranged. Accordingly, the total cost of the third year is equal to 7×4+5×3+1×9+1×278=330. The total cost difference of the third year from the previous year (second year) is equal to 330−228=102.

Furthermore, the total cost difference of the second year from the previous year (first year) is equal to 144, and the total cost difference of the third year form the previous year (second year) is equal to 102, so that the variation in total cost difference from the second year to the third year is equal to 102−144=−42. Accordingly, the maximum value of the variations (absolute values) in total cost difference of the respective years is equal to 60 because of |60|>|−42|.

FIG. 12 is a diagram (part 2) showing an example of the site type selection. From the state shown in FIG. 9, the change of the site selection is performed on an OADM section having the highest demand number of the first year among the respective OADM sections so that reachability (for example, OSNR) is enhanced. In this case, the demand number between the sites A and B is equal to the highest value (10) (see FIG. 7), and thus the site 511 between A and B is changed from ILA to EXPRESS.

FIG. 13 is a diagram showing the REG number per demand in the design shown in FIG. 12. A table 1300 of FIG. 13 represents the required number of REGs per demand shown in FIG. 6 and the REG number per demand calculated on the basis of the provisional determination of the site type shown in FIG. 12. In this case, the REG numbers between the sites A and B, between the sites A and C and between the sites A and D in the respective OADM sections will be described.

As shown in the table 1300, between the sites A and B, the OADM section number is equal to 1, and the ILA number is equal to 2, so that the REG number required every demand is equal to zero (see FIG. 6). Furthermore, the demand number of the first year between the sites A and B is equal to 10 (see FIG. 8), and thus the required REG number of the first year between the sites A and B is equal to 0×10=0.

Furthermore, the demand number of the second year between the sites A and B is equal to 15 (see FIG. 8), and thus the required REG number of the second year between the sites A and B is equal to 0×15=0. Furthermore, the demand number of the third year between the sites A and B is equal to 20 (see FIG. 8), and thus the required REG number of the third year between the sites A and B is equal to 0×20=0.

As shown in the table 1300, between the sites A and C, the OADM section number is equal to 2 and the ILA number is equal to 5, so that the REG number required per demand is equal to 2 (see FIG. 6). The demand number in the first year between the sites A and C is equal to zero (see FIG. 8), and the required REG number in the first year between the sites A and C is equal to 2×0=0.

The demand number of the second year between the sites A and C is equal to 13 (see FIG. 8), and thus the required REG number of the second year between the sites A and C is equal to 2×13=26. The demand number of the third year between the sites A and C is equal to 13 (see FIG. 8), and thus the required REG number of the third year between the sites A and C is equal to 2×13=26.

As shown in the table 1300, between the sites A and D, the OADM section number is equal to 3 and the ILA number is equal to 8, so that the REG number required every demand is equal to 5 (see FIG. 6). The demand number of the first year between the sites A and D is equal to zero (see FIG. 8), and thus the required REG number of the first year between the sites A and D is equal to 5×0=0.

The demand number of the second year between the sites A and D is equal to 10 (see FIG. 8), and thus the required REG number of the second year between the sites A and D is equal to 5×10=50. Furthermore, the demand number of the third year between the sites A and D is equal to 15 (see FIG. 8), and thus the require REG number of the third year between the sites A and D is equal to 5×15=75.

FIG. 14 is a diagram showing the total cost in the design shown in FIG. 12. A table 1400 of FIG. 14 represents the total cost calculated on the basis of the provisional determination of the site type shown in FIG. 12 and the REG number required every OADM section shown in FIG. 13.

In the first year, four OADMs (cost 7), four EXPESSes (cot 5), eight ILAs (cost 1) and 22 REGs (cost 1) are arranged. Accordingly, the total cost of the first year is equal to 7×4+5×4+1×8+1×22=78. Since no previous year exists prior to the first year (initial year), the difference of the first year from the previous year (the cost difference between years: inter-year cost difference) is set to 78. The variation of the total cost difference of the first year is set to zero.

In the second year, four OADMs (cost 7), four EXPRESSes (cost 5), eight ILAs (cost 1) and 148 REGs (cost 1) are arranged. Accordingly, the total cost of the second year is equal to 7×4+5×4+1×8+1×148=240. The difference in total cost of the second year from the previous year (first year) is equal to 204−78=126.

The total cost difference of the first year from the previous year is equal to 78, and the total cost difference of the second year from the previous year (first year) is equal to 126, so that the variation of the total cost difference from the first year to the second year is equal to 126−78=48.

In the third year, four OADMs (cost 7), four EXPRESSes (cost 5), eight ILA (cost 1) and 245 REGs (cost 1) are arranged. Accordingly, the total cost of the third year is equal to 7×4+5×4+1×8+1×245=301. The total cost difference of the third year from the previous year (second year) is equal to 301−204=97.

Furthermore, the total cost difference of the second year from the previous year (first year) is equal to 126, and the total cost difference of the third year from the previous year (second year) is equal to 97, so that the variation of the total cost difference between the second year and the third year is equal to 97−126=−29. Accordingly, the maximum value of the variations (absolute values) of the total cost difference of the respective years is equal to 48 because of |48|>|−29|.

FIG. 15 is a diagram (part 1) showing the comparison of the variation of the total cost difference among the respective years. A table 1500 shown in FIG. 15 is a table for comparing the variation of the total cost difference shown in FIG. 11 and the variation of the total cost difference shown in FIG. 14. The network design device compares with the maximum value of the variations (absolute values) of the respective total cost differences.

When the maximum value of the variation of the total cost difference in the latest design (reference numeral 1520) is reduced to be less than the maximum value of the variation amount of the total cost difference in the previous design, the network design device adopts the latest design as a new provisionally determined design. In this case, the maximum value 48 of the variation amount of the total cost difference indicated by reference numeral 1520 is reduced to be less than the maximum value 60 of the variation 1510 of the total cost difference indicated by reference numeral 1510, and thus the network design device adopts the design shown in FIG. 12 as a new provisionally determined design.

Figure 16:
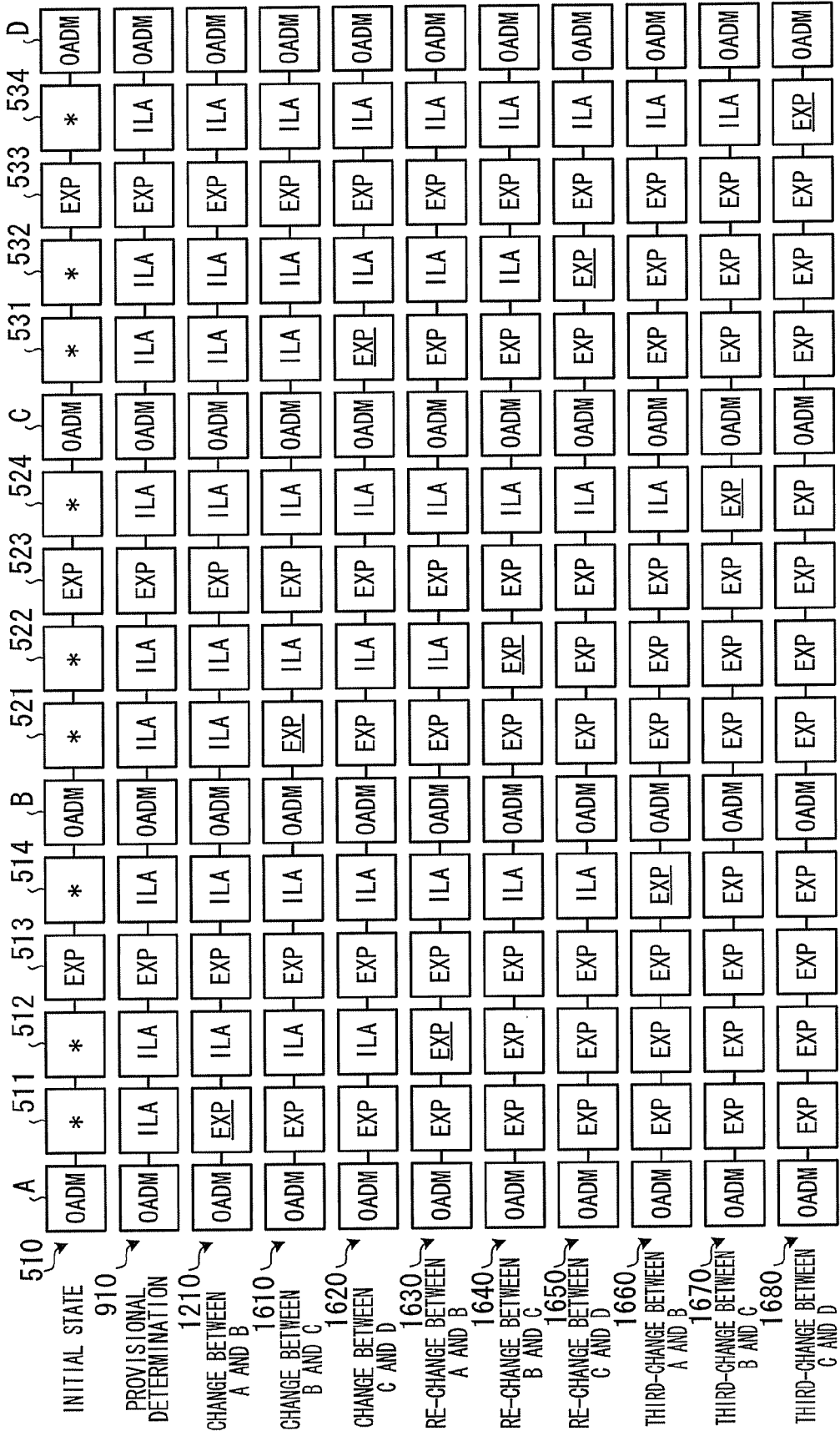
FIG. 16 is a diagram (part 3) showing an example of the site type selection.

FIG. 16 is a diagram (part 3) showing an example of the site type selection. The network design device executes the operation shown in FIGS. 12 to 15 in each OADM section where the site type has not yet been determined. First, as indicated by reference numeral 1610, the site 521 between the sites B and C is changed from ILA to EXPRESS. Subsequently, as indicated by 1620, the site 531 between the sites C and D is changed from ILA to EXPRESS.

Subsequently, as indicated by reference numeral 1630, the site 512 between the sites A and B is changed from ILA to EXPRESS. Subsequently, as indicated by reference numeral 1640, the site 522 between the sites B and C is changed from ILA to EXPRESS. Subsequently, as indicated by reference numeral 1650, the site 532 between the sites C and D is changed from ILA to EXPRESS.

Subsequently, as indicated by reference numeral 1660, the site 514 between the sites A and B is changed from ILA to EXPRESS. Subsequently, as indicated by reference numeral 1670, the site 524 between the sites B and C is changed from ILA to EXPRESS. Subsequently, as indicated by reference numeral 1680, the site 534 between the sites C and D is changed from ILA to EXPRESS.

Furthermore, the network design device compares the maximum value of the variation of the total cost difference in the latest design with the maximum value of the variation of the total cost difference in the previous design every time the site is changed from ILA to EXPRESS. Then, the network design device settles the previous design as the design result when the maximum value of the variation of the total cost difference in the latest design is not reduced to be less than the maximum value of the variation of the total cost difference in the previous design.

FIG. 17 is a diagram (part 2) showing the comparison of the variation of the total cost difference among the respective years. In FIG. 17, the same parts as shown in FIG. 15 are represented by the same reference numerals, and the description thereof is omitted.

A table 1700 of FIG. 17 represents the variations of the total cost differences under the respective states of reference numerals 910, 1210, 1610, 1620, 1630, 1640, 1650, 1660, 1670 and 1680 every year (reference numerals 1510, 1520, 1710, 1720, 1730, 1740, 1750, 1760, 1770, 1780).

In the state indicated by reference numeral 1610 of FIG. 16, the maximum value 31 of the variation of the latest total cost difference (reference 1710) is reduced to be less than the maximum value 48 of the variation amount 1520 of the previous total cost difference. Therefore, the design indicated by reference numeral 1610 of FIG. 16 is adopted as a new provisionally determined design. Subsequently, the network design device shifts to the state indicated by reference numeral 1620 of FIG. 16.

Under the state indicated by reference numeral 1620 of FIG. 16, the maximum value 26 of the variation amount of the latest total cost difference (reference numeral 1720) is reduced to be less than the maximum value 31 of the variation amount 1710 of the previous total cost difference. Therefore, the design indicated by reference numeral 1620 of FIG. 16 is adopted as a new provisionally determined design. Subsequently, the network design device shifts to the state indicated by reference numeral 1630.

Under the state indicated by reference numeral 1630 of FIG. 16, the maximum value 13 of the variation of the latest total cost difference (reference numeral 1730) is reduced to be less than the maximum value 26 of the variation 1720 of the previous total cost difference. Therefore, the design indicated by reference numeral 1630 of FIG. 16 is adopted as a provisionally determined design. Subsequently, the network design device shifts to the state indicated by reference numeral 1640 of FIG. 16.

Under the state as indicated by reference numeral 1640 of FIG. 16, the maximum value 21 of the variation amount of the latest total cost difference (reference numeral 1740) increases to be more than the maximum value 13 of the variation amount 1730 of the previous total cost difference. Therefore, the design indicated by reference numeral 1630 of FIG. 16 is settled as a design result, and the design result is output to the user.

FIG. 18 is a diagram showing the REG number per demand in the design indicated by reference numeral 1630 of FIG. 16. A table 1800 of FIG. 18 represents the required number of REGs per demand shown in FIG. 6 and the REG number per demand calculated on the basis of the provisional determination of the site type indicated by reference numeral 1630 of FIG. 16. In this case, the REG numbers between the sites A and B, between the sites A and C and the sites A and D in the respective OADM sections will be described.

As indicated in the table 1800, between the sites A and B, the OADM section number is set to 1 and the ILA number is set to 1, so that the REG number required per demand is equal to zero (see FIG. 6). The demand number of the first year between the sites A and B is equal to 10 (see FIG. 8), and the REG number required in the first year between the sites A and B is equal to 0×10=0.

Furthermore, the demand number of the second year between the sites A and B is equal to 15 (see FIG. 8), and the REG number required in the second year between the sites A and B is equal to 0×15=0. The demand number of the third year between the sites A and B is equal to 20 (see FIG. 8). Therefore, the REG number required in the third year between the sites A and B is equal to 0×20=0.

As indicated in the table 1800, between the sites A and C, the OADM section number is equal to 2 and the ILA number is equal to 3, so that the REG number required per demand is equal to 1 (see FIG. 6). The demand number of the first year between the sites A and C is equal to 0 (see FIG. 8), and the REG number required in the first year between the sites A and C is equal to 1×0=0.

The demand number of the second year between the sites A and C is equal to 13 (see FIG. 8), and thus the REG number required in the second year between the sites A and C is equal to 1×13=13. The demand number of the third year between the sites A and C is equal to 13 (see FIG. 8), and thus the REG number required in the third year between the sites A and C is equal to 1×13=13.

As indicated in the table 1800, between the sites A and D, the OADM section number is equal to 3 and the ILA number is equal to 5, so that the REG number required per demand is equal to 3 (see FIG. 6). The demand number of the first year between the sites A and D is equal to zero (see FIG. 8), and the REG number required in the first year between the sites A and D is equal to 3×0=0.

The demand number of the second year between the sites A and D is equal to 10 (see FIG. 8), and thus the REG number required in the second year between the sites A and D is equal to 3×10=30. The demand number of the third year between the sites A and D is equal to 15 (see FIG. 8), so that the REG number required in the third year between the sites A and D is equal to 3×15=45.

FIG. 19 is a diagram showing the total cost in the design indicated by reference numeral 1630 of FIG. 16. A table 1900 of FIG. 19 represents the total cost calculated on the basis of the provisional determination of the site type in the design indicated by reference numeral 1630 of FIG. 16 and the REG number required every OADM section shown in FIG. 18.

In the first year, four OADM (cost 7), seven EXPRESSes (cost 5), five ILAs (cost 1) and 16 REGs (cost 1) are arranged. Accordingly, the total cost of the first year is equal to 7×4+5×7+1×5+1×16=84. No previous year exists prior to the first year (initial year), and thus the total cost difference of the first year from the previous year is set to 84. The variation of the total cost difference of the first year is set to zero.

In the second year, four OADMs (cost 7), seven EXPRESSes (cost 5), five ILA (cost 1) and 99 REGs (cost 1) are arranged. Accordingly, the total cost of the second year is equal to 7×4+5×7+1×5+1×99=167. The total difference of the second year from the previous year (first year) is equal to 167−84=83.

The difference of the first year from the previous year is equal to 84, and the total cost difference of the second year from the previous year (first year) is equal to 83, so that the variation from the first year to the second year is equal to 83−84=−1.

In the third year, four OADMs (cost 7), seven EXPRESSes (cost 5), five ILAs (cost 1) and 169 REGs (cost 1) are arranged. Accordingly, the total cost of the third year is equal to 7×4+5×7+1×5+1×169=237. The total cost difference of the third year from the previous year (second year) is equal to 237−167=70.

The total cost difference of the second year from the previous year (first year) is equal to 83, and the total cost difference of the third year from the previous year (second year) is equal to 70, so that the variation of the total cost difference from the second year to the third year is equal to 70−83=−13. Accordingly, the maximum value of the variations (absolute values) in the total cost difference among the respective years is equal to |−1|<|−13|, and thus equal to 13.

As described above, by using the restricting condition for minimizing the variations of the respective total costs at plural timings, the respective total costs at the plural timings can be equalized. Accordingly, the investment costs at the respective timings can be prevented from being unbalanced.

Figure 20:
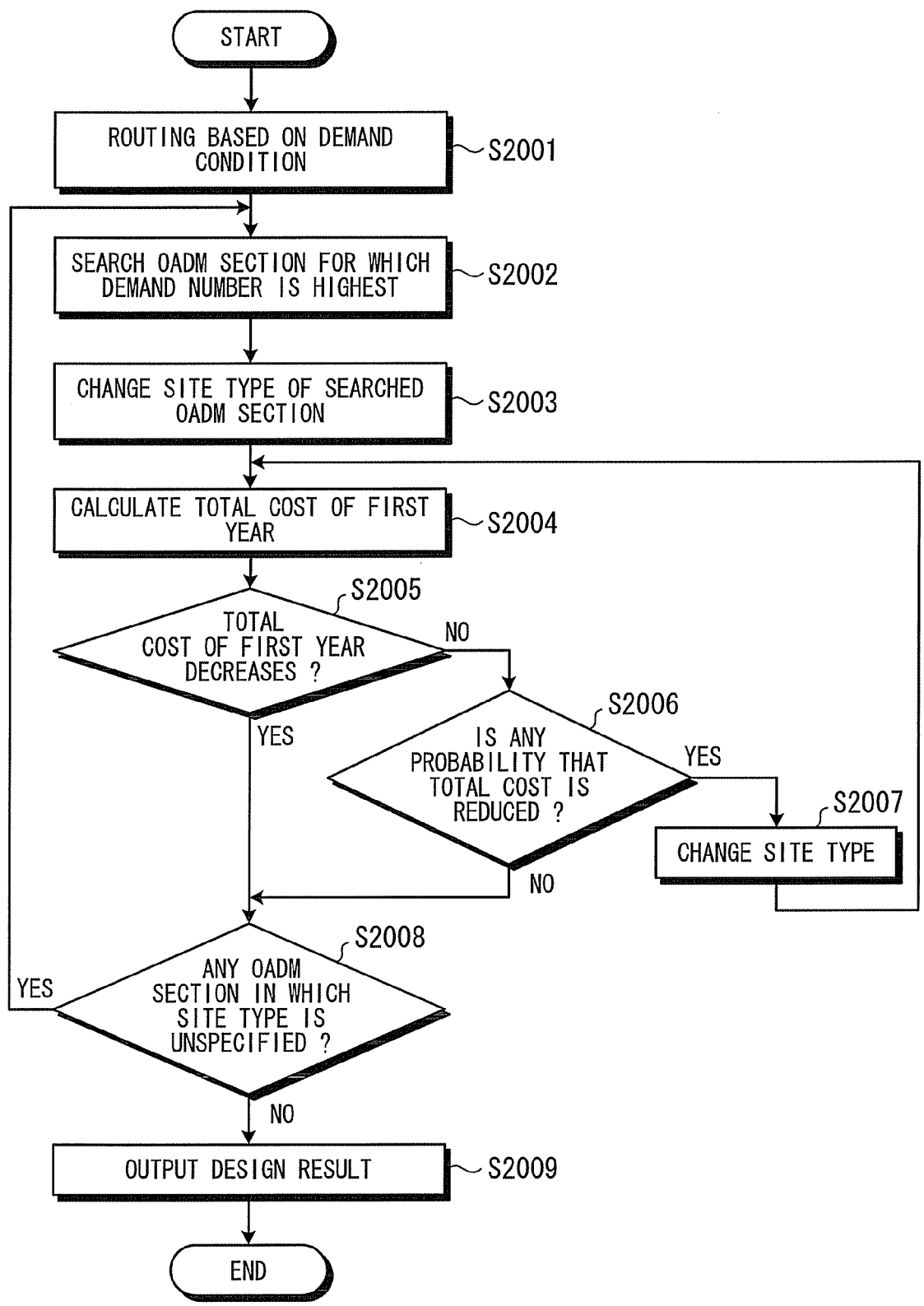
FIG. 20 is a flowchart showing an example (first-year cost is minimum) of the operation of a network design device.

FIG. 20 is a flowchart showing an example of the operation of the network design device (the first year cost is minimum).

In step S104 of FIG. 1, when "first year cost is minimum" is selected as the restricting condition, the network design device first executes the routing on the basis of the demand condition (step S200). In step S2001, the same routing as the routing shown in FIG. 8 is executed, for example.

Next, a OADM section having the highest demand number is searched from the OADM sections whose site types have not yet been settled (step S2002). In step S2002, for example in the case of the example shown in FIG. 8, the area between sites A and B is first searched. When the site type between the sites A and B is settled, the area between the sites C and D is searched. After the site type between the sites C and D is settled, the area between the sites B and C is searched.

Subsequently, the site type of the OADM section searched in step S2002 is changed (step S2003). In step S2003, for example, the site type of any site in the OADM section is changed from ILA to EXPRESS so as to enhance the reachability (see FIGS. 9, 12 and 16).

Subsequently, the total cost in the first year when the site type is changed in step S2003 is calculated (step S2004). In step S2004, the total cost is calculated by using the same method as the calculation method of the total cost described with reference to FIG. 19 (only the total cost in the first year may be calculated).

Subsequently, it is determined whether the total cost in the first year calculated in step S2004 is reduced to be less than the total cost calculated in step S2004 before one loop (step S2005). In this case, it is determined that the total cost is not reduced in the step S2005 before one loop.

When the total cost is not reduced in step S2005 (step S2005: No), it is determined whether there is any probability that the total cost is reduced due to the change of the site type (step S2006). Specifically, it is determined whether the site type of any site of the OADM section searched in step S2005 can be changed so that the total cost can be reduced (for example, the change from ILA to EXPRESS).

When there is no probability that the total cost is reduced in step S2006 (step S2006: No), the network design device shifts to step S2008 to continue the processing. When there is a probability that the total cost is reduced (step S2006: Yes), the site type of any site of the OADM section searched in step S2002 is changed (step S2007), and the network design device shifts to the step S2004 to continue the processing.

When the total cost is reduced in step S2005 (step S2005: Yes), it is determined whether there is any OADM section whose site type has not yet been settled (step S2008). When there is an OADM section whose site type has not yes been settled (step S2008: Yes), the processing is returned to the step S2002 and continued. When there is no OADM section whose site type has not yet been settled (step S2008: No), the design result is output (step S2009), and the series of processing is finished.

FIG. 21 is a diagram showing an example of the design result obtained through the operation shown in FIG. 20. A table 2100 shown in FIG. 21 represents design results obtained through the operation shown in FIG. 20 under the respective conditions shown in FIGS. 5 to 7. In the design results obtained through the operation shown in FIG. 20, the design is made so that the total cost in the initial year (first year) (reference numeral 2110) is minimum.

In this case, the design in which the total cost in the first year is minimized will be described. However, the target year is not limited to the first (initial) year. For example, the target year may be indicated by a user so as to make such a design that the total cost in the indicated year is minimized. As described above, according to the operation shown in FIGS. 20 and 21, the investment cost based on the network design at a specific timing can be minimized. Accordingly, the flexibility of the network design can be enhanced.

Figure 22:
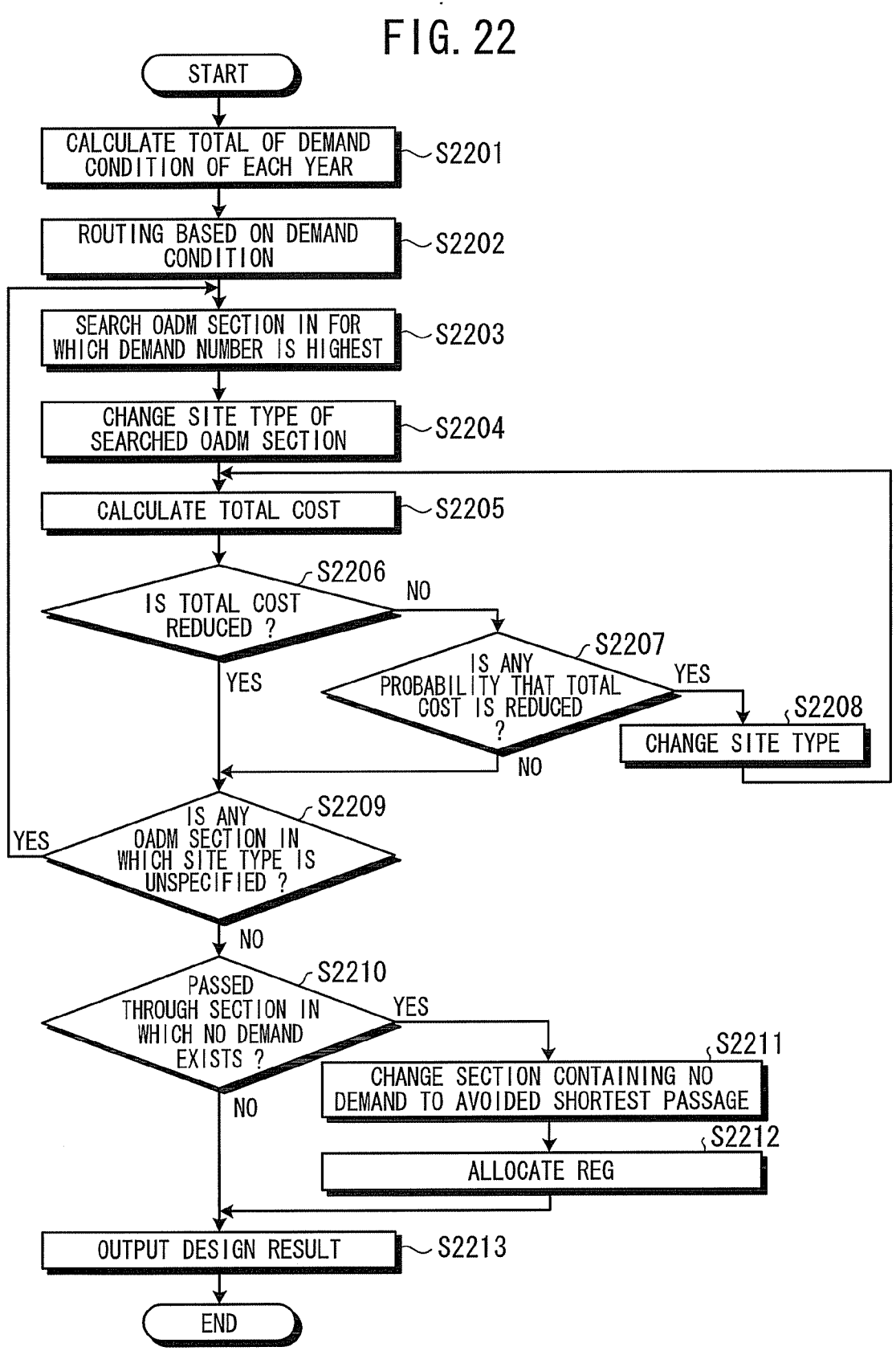
FIG. 22 is a flowchart showing an example (all-year accumulated cost is minimum) of the operation of the network design device.

FIG. 22 is a flowchart showing an example of the operation of the network design device (all-year accumulated cost is minimum).

In step S104 of FIG. 1, when "all-year accumulated cost is minimum" is selected as a restricting condition, the network design device first calculates the total of the input demand conditions of the respective years (step S2201). Subsequently, the routing is executed on the basis of the total of the demand conditions calculated in step S2201 (step S2202).

The steps S2203 to 2209 shown in FIG. 22 are the same as the steps S2002 to S2008 shown in FIG. 20, and thus the description thereof is omitted. In step S2205, the accumulated total cost of the respective years when the site type is changed in step S2204 is calculated (step S2205).

In step S2209, when there is no OADM section whose site type has not yet been settled (step S2209: No), it is determined whether the present design route passes through a section in which no demand exists (step S2210). When the present design route passes through a section in which no demand exists (step S2210: Yes), the design route is changed to the shortest route which avoids any section in which no demand exists (step S2211).

Next, REG is allocated to the design route changed in step S2211 (step S2212), and the processing shifts to step S2213. When it is determined in S2210 that the present design route does not pass through any section in which no demand exists (step S2210: No), a design result is output (step S2213), and the series of processing is finished.

FIG. 23 is a diagram showing an example of the design result based on the operation shown in FIG. 22. A table 2300 shown in FIG. 23 represents a design result obtained through the operation shown in FIG. 22 under the respective conditions shown in FIGS. 5 to 7. In the design result based on the operation shown in FIG. 22, the design that the accumulation of the respective total costs of all the years (reference numeral 2310) is minimum is obtained. Therefore, even when the restricting condition or the network condition varies with time lapse, the final investment cost can be suppressed to the minimum level.

Figure 24:
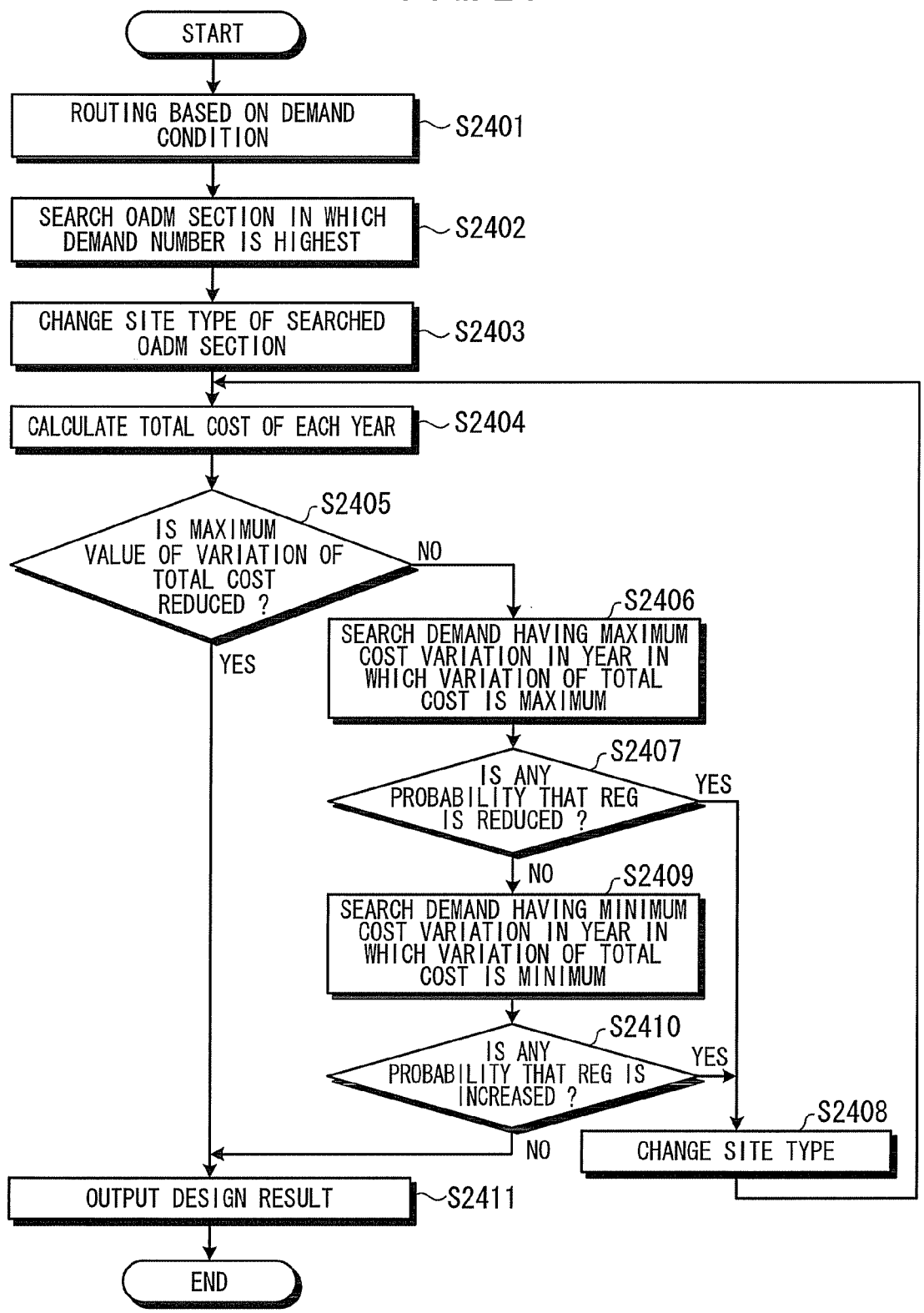
FIG. 24 is a flowchart showing an example (cost variation is minimum) of the operation of the network design device.

FIG. 24 is a flowchart showing an example of the operation of the network design device (the cost variation is minimum). In step S104 of FIG. 1, the operation of the network design device when "cost variation is minimum" (not shown in FIG. 1) is selected as the restricting condition will be described. The steps S2401 to S2403 shown in FIG. 24 are the same as the steps S2001 to S2003 shown in FIG. 20, and thus the description thereof is omitted.

After the site type of the OADM section is changed in step S2403, the network design device calculates the total costs of the respective years when the site type is changed in step S2403 (step S2404). In step S2404, the total cost is calculated by the same method as the total cost calculation method described with reference to FIGS. 11, 14 and 19, for example.

Subsequently, it is determined whether the maximum value (for example, 60 in the example shown in FIG. 11) of the variations of the total costs of the respective years which is calculated in step S2404 is reduced to be less than the maximum value of the variations of the total costs of the respective years which is calculated in step S2404 before one loop (step S2405). However, in the step S2405 of the first loop, it is determined that the maximum value of the variations of the total costs of the respective years is not reduced.

When the maximum value of the variations of the total costs in step S2405 is not reduced (step S2405: No), a demand having the maximum cost variation in a year which brings the maximum variation of the total cost (for example, the second year in the example shown in FIG. 11) is searched (step S2406). Subsequently, it is determined whether the demand searched in step S2406 has any REG and there is a probability that the REG concerned can be reduced (step S2407).

In step S2407, it is determined whether REG can be reduced by changing the site type. When there is a probability that REG can be reduced (step S2407: Yes), the site type is changed (step S2408), and the processing is returned to step S2404 and continued. When there is no probability that REG can be reduced (step S2407: No), a demand having the minimum cost variation in a year which brings the minimum variation of the total cost (for example, the third year in the example shown in FIG. 11) is searched (step S2409).

Subsequently, it is determined whether there is a probability that REG of the demand searched in step S2409 can be increased (step S2410). When there is a probability that REG can be increased (step S2410: Yes), the processing is shifted to step S2408 and continued.

When there is no probability that REG can be increased (step S2410: No), the processing is shifted to step S2411 and continued. When the maximum value of the variation amount of the total cost is reduced in step S2405 (step S2405: Yes), a design result is output (step S2411), and the series of processing is finished. According to the operation shown in FIG. 24, the respective total costs at the plural timings can be equalized as in the case of the example shown in FIGS. 5 to 19.

Figure 25:
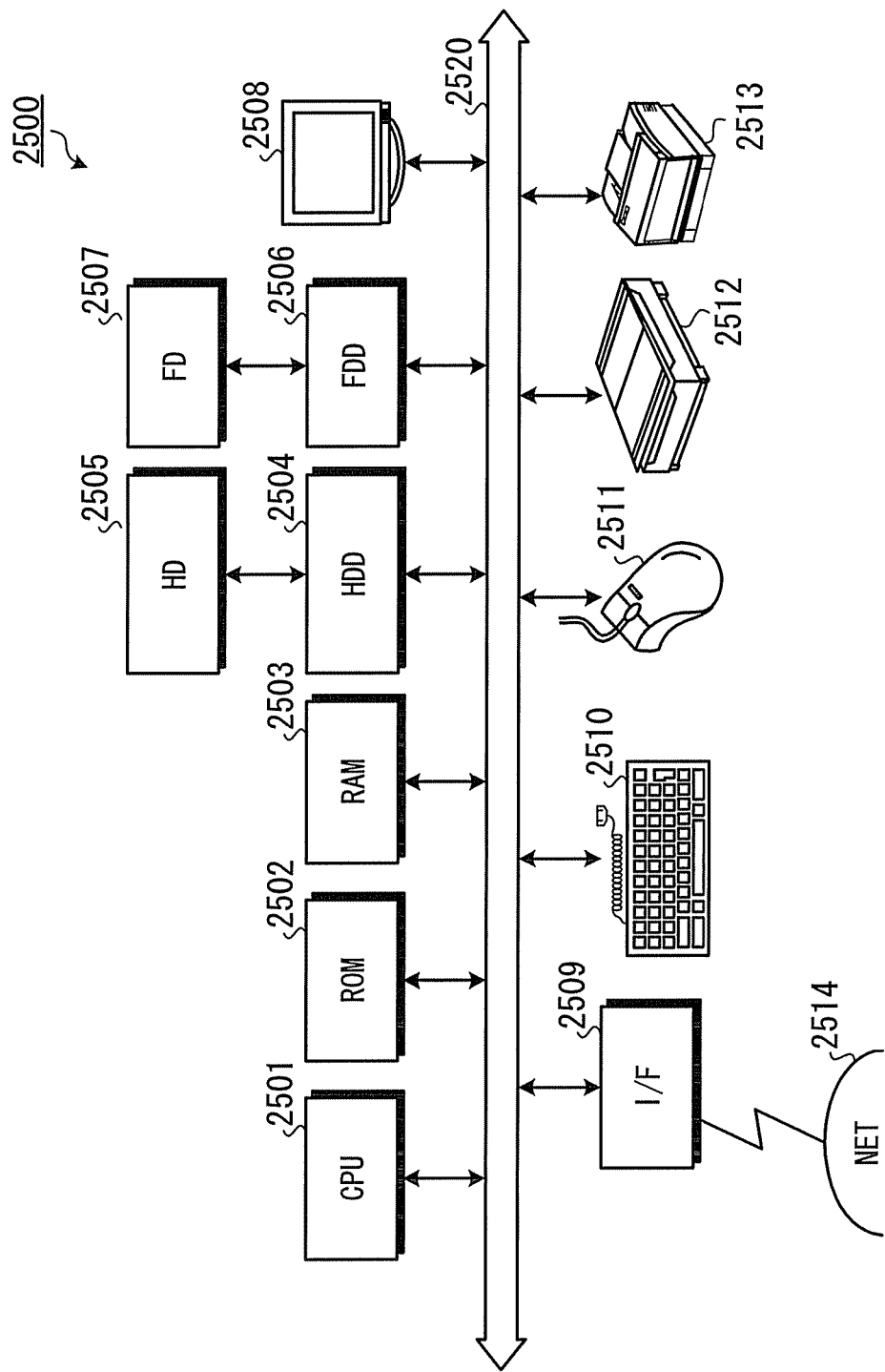
FIG. 25 is a block diagram showing an example of the hardware construction of the network design device according to this embodiment.

FIG. 25 is a block diagram showing an example of the hardware construction of the network design device according to this embodiment. In FIG. 25, a network design device 2500 comprises CPU 2501, ROM 2502, RAM 2503, HDD (hard disk drive) 2504, HD (hard disk) 2505, FDD (flexible disk drive) 2506, FD (flexible disk) 2507 as an example of a detachable recording medium, a display 2508, I/F (interface) 2509, a keyboard 2510, a mouse 2511, a scanner 2512, and a printer 2513. The respective constituent elements are connected to one another through a bus 2520.

Here, CPU 2501 controls the whole of the network design device 2500. ROM 2502 stores programs such as a boot program, etc. RAM 2503 is used as a work area of CPU 2501. HDD 2504 controls data read/write from/into HD 2505 according to the control of CPU 2501. HD 2505 stores data which are written under the control of HDD 2504.

FDD 2506 controls data read/write from/into FD 2507 according to the control of CPU 2501. FD 2507 stores data written under the control of FDD 2506 and makes the network design device 2500 read out data stored in FD 2507.

In addition to FD 2507, CD-ROM (CD-R, CD-RW), MO, DVD (Digital Versatile Disk), a memory card or the like may be used as the detachable recording medium. The display 2508 displays a cursor, icons, a tool box and data such as documents, images, function information, etc. CRT, a TFT liquid crystal display, a plasma display or the like may be used as the display 2508, for example.

I/F 2509 is connected to a network 2514 (NET) such as the Internet or the like through a communication line, and also connected to another device through the network 2514. I/F 2509 serves as an internal interface to the network 2514, and controls input/output of data from an external device. For example, a modem, a LAN adaptor or the like may be used as I/F 2509.

The keyboard 2510 has keys for inputting characters, numerals, various kinds of instructions, etc., and inputs data. A touch panel type input pad or numeric keypads may be equipped as the keyboard 2510. The mouse 2511 moves the cursor, selects a range, moves a window, changes the size of the window, etc. A track ball, a joy stick or the like may be used insofar as it has the same functions as a pointing device.

The scanner 2512 optically reads an image, and takes image data into the network design device 2500. The scanner 2512 may be brought with an OCR function. Furthermore, the printer 2513 prints image data and document data. A laser printer, an ink jet printer or the like may be adopted as the printer 2513, for example.

The CPU 2501 controls the display 2508 and the printer 2513 to perform display to the user in steps S101, S103 of FIG. 1. For example, CPU 2501 obtains an input from the user through the keyboard 2510, the mouse 2511, the scanner 2512 or the like to perform the processing of the step S102 of FIG. 1, whereby the network condition every plural timings are input in advance (input step). The network conditions input in the input step are stored in the memory such as RAM 2503, HD 2505 or the like (first storage step).

Subsequently, CPU 2501 obtains an input from the user through the keyboard 2510, the mouse 2511, the scanner 2512 or the like to perform the step S104 of FIG. 1, whereby the restricting conditions concerning the respective costs at plural timings are accepted (acceptance step). The restricting conditions input in the acceptance step are stored in the memory such as RAM 2503, HD 2505 or the like (second storage step).

Subsequently, in the steps S105 to S115 of FIG. 1, CPU 2501 reads out the network conditions and the restricting conditions stored in the memory such as RAM 2503, HD 2505 or the like (first read-out step). CPU 2501 performs the operation with using RAM 2503 as a work area, thereby designing a network satisfying the read-out restricting condition under the read-out network condition (design step).

The design result of the design step is stored in the memory such as RAM 2503, HD 2505 or the like (third storage step). Subsequently, in step S116 of FIG. 1, CPU 2501 reads out from the memory the design result stored in the memory such as RAM 2503, HD 2505 or the like (second read-out step).

CPU 2501 controls the display 2508 or the printer 2513 to output the read-out design result.

In steps S102, S104 of FIG. 1, input information transmitted from another computer on the network 2514 may be accepted through I/F 2509. Furthermore, in the step S116 of FIG. 1, CPU 2501 may write the design result into HD 2505 or FD 2507, or transmit the design result to another computer on the network 2514 through I/F 2509, thereby outputting the design result.

As described above, according to the network design method and the network design device described above, even when the restricting condition or the network condition varies with time lapse, a desired design result can be obtained. In the above-described embodiment, the design of the linear network containing the sites A to D, 511 to 514, 521 to 524 and 531 to 534 have been described. However, the style of the network is not limited to the above embodiment, and it may be applied to the design of networks of various styles.

The various embodiments are not limited to the core design procedure described above, but various kinds of procedures such as a design prioritizing that the core cost is small, a design prioritizing that occurrence of noise is little. Furthermore, these procedures may be implemented by linear programming or integer programming.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A method for optimizing a network containing a plurality of nodes, the method comprising:
inputting a network condition at each of plural timings in advance, the network condition being dependent on a number of nodes contained in the network and a type of each node contained in the network;
accepting options of different restricting conditions concerning respective costs at each of the plural timings;
designing, using a processor, a network satisfying a restricting condition accepted in the accepting under the network condition input in the inputting;
outputting a design result of the designing;
determining a maximum value of a variation of a total cost difference in the output design for each period between the plural timings;
comparing the determined maximum value in the output design with a maximum value of a variation of a total cost difference in a previous design; and
when the maximum value in the output design is less than the maximum value in the previous design, adopting the output design for the network.

2. The method according to claim 1, wherein the accepting includes selection of at least one of plural restricting conditions.

3. The method according to claim 1, wherein, in the inputting, a different demand is input as the network condition for each of the plural timings.

4. The network design method according to claim 2, wherein the plural restricting conditions contain a restricting condition under which an investment cost at a specific timing out of the plural timings is minimized.

5. The network design method according to claim 2, wherein the plural restricting conditions contain a restricting condition under which all investment costs at the plural timings are not more than a threshold value.

6. The network design method according to claim 2, wherein the plural restricting conditions contain a restriction condition under which a total of respective investment costs at the plural timings is minimized.

7. The network design method according to claim 2, wherein the plural restricting conditions contain a restriction condition under which variation of respective investment costs at the plural timings is minimized.

8. The method according to claim 3, wherein, in the designing, a site routing is executed based on the different demands, and a site type of each site that is subjected to the routing is changed so as to satisfy the restricting condition.

9. A method for optimizing a network containing a plurality of nodes, the method comprising:
inputting a network condition at each of plural timings in advance, the network condition being dependent on a number of nodes contained in the network and a type of each node contained in the network;
first storing the network condition input in the inputting into a memory;
accepting options of different restricting conditions concerning respective costs at each of the plural timings;
second storing the restricting conditions accepted in the accepting into the memory;
first reading out a network condition stored in the first storing and a restricting condition stored in the second storing from the memory;
designing, using a processor, a network satisfying the restricting condition read out in the first reading under the network condition read out in the first reading;
third storing a design result of the designing into the memory;
second reading out the design result stored in the third storing from the memory;
outputting the design result read out in the second reading;
determining a maximum value of a variation of a total cost difference in the output design for each period between the plural timings;

comparing the determined maximum value in the output design with a maximum value of a variation of a total cost difference in a previous design; and when the maximum value in the output design is less than the maximum value in the previous design, adopting the output design for the network.

10. A device for optimizing a network containing a plurality of nodes, comprising:

an input unit that inputs a network condition at each of plural timings in advance, the network condition being dependent on a number of nodes contained in the network and a type of each node contained in the network;

an acceptance unit that accepts options of different restricting conditions concerning respective costs at each of the plural timings;

a design unit that designs a network satisfying a restricting condition accepted in the acceptance unit under the network condition input by the input unit; and an output unit that outputs a design result of the design unit; and one or more processors that determines a maximum value of a variation of a total cost difference in the output design for each period between the plural timings, compares the determined maximum value in the output design with a maximum value of a variation of a total cost difference in a previous design, and, when the maximum value in the output design is less than the maximum value in the previous design, adopts the output design for the network.

11. A network design device, comprising:

an input unit that inputs a network condition at each of plural timings in advance, the network condition being dependent on a number of nodes contained in the network and a type of each node contained in the network;

a first storage unit that stores the network condition input by the input unit into a memory;

an acceptance unit that accepts options of different restricting conditions concerning respective costs at each of the plural timings;

a second storage unit that stores the restricting condition accepted by the acceptance unit into the memory;

a first read-out unit that reads out a network condition stored by the first storage unit and a restricting condition stored by the second storage unit from the memory;

a design unit that designs a network satisfying the restricting conditions read out by the first read-out unit under the network condition read out by the first read-out unit;

a third storage unit that stores a design result of the design unit into the memory;

a second read-out unit that reads out the design result stored by the third storage unit from the memory;

an output unit that outputs the design result read out by the second read-out unit; and one or more processors that determines a maximum value of a variation of a total cost difference in the output design for each period between the plural timings, compares the determined maximum value in the output design with a maximum value of a variation of a total cost difference in a previous design, and, when the maximum value in the output design is less than the maximum value in the previous design, adopts the output design for the network.

* * * * *